Mar. 13, 1923.
L. VOLLMUTH
TROLLEY HARP
Filed Nov. 25, 1921
1,448,474
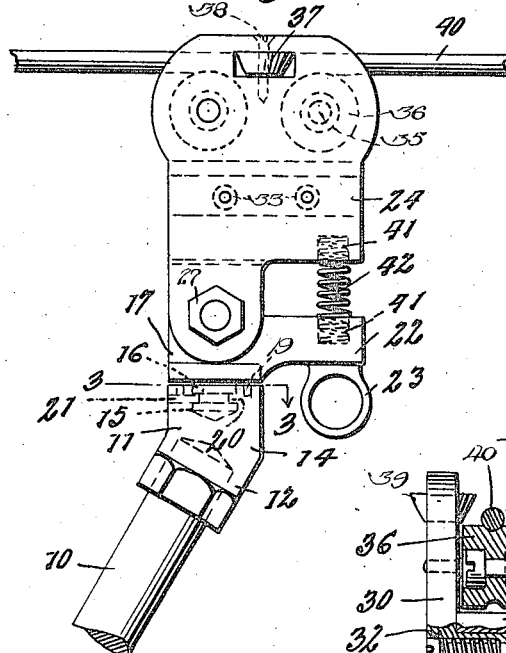
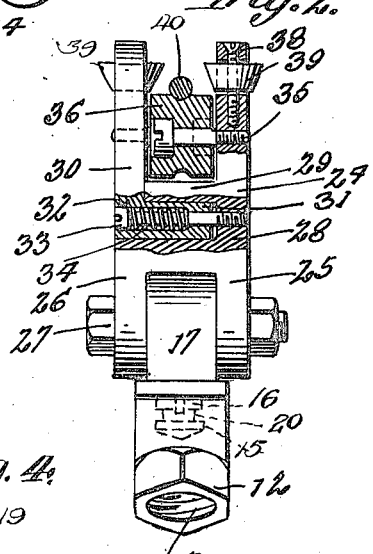
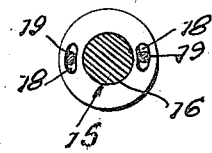
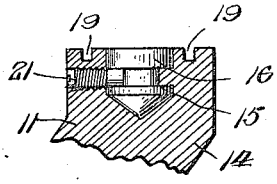
WITNESSES
Guy M Spring
Inventor
LOUIS VOLLMUTH
By Richard B Owen
Attorney Patented Mar. 13, 1923.

1,448,474

UNITED STATES PATENT OFFICE.

LOUIS VOLLMUTH, OF CHICAGO, ILLINOIS.

TROLLEY HARP.

Application filed November 25, 1921. Serial No. 517,723.

*To all whom it may concern:*

Be it known that I, LOUIS VOLLMUTH, a subject of Germany, residing at Chicago, in the county of Cook and State of Illinois, have invented certain new and useful Improvements in Trolley Harps, of which the following is a specification.

This invention has relation to trolley harps or the like, and has for an object to provide a device of this character which is designed to prevent the trolley from leaving the wire, to reduce friction and wear and to accomplish other objects which will become apparent as the nature of the invention is explained.

Another object of the invention is to provide a trolley harp which embodies in addition to a wire engaging wheel, a second pair of wheels, either of which are engaged by the wire when the harp is swung laterally, thus acting as stop means to prevent the harp from leaving the wire and to reduce friction and wear upon the wire.

In addition to the foregoing this invention comprehends improvements in the details of construction and arrangement on parts to be hereinafter described and particularly set forth in the appended claims.

In the accompanying drawings in which similar and corresponding parts are designated by the same characters of reference throughout the several views in which they appear:

Figure 1 is a view in side elevation of a trolley harp constructed in accordance with my invention.

Figure 2 is a view of the harp in end elevation with parts broken away.

Figure 3 is a detail section taken on the line 3—3 of Figure 1.

Figure 4 is a vertical section on an enlarged scale of the swivel connection hereinafter described.

With reference to the drawings 10 indicates the upper end of a trolley pole and 11 a socket member consisting of one end portion 12 having a threaded socket 13 to receive the end of the pole, said portion being formed polygonal to provide a wrench grip. The opposite end portion 14 of the socket member is disposed at an angle to the portion 13 so as to be vertical when the pole is at an angle. The end 14 is formed with a socket 15 in which a reduced extension 16 of a lug 17 is seated for rotation in a horizontal plane. The face of the end 14 is formed with a pair of opposed arcuate grooves or recesses 18 in which pins 19 depending from the lug 17 are received, said pin and slot connection limiting rotative movement of the lug. The extension 16 is formed with an annular groove 20 in which a set screw 21 is received, the latter being threaded into the portion 14. The lug 17 is formed with a horizontal extension 22 which is formed with an integral depending ring 23 to which a cord may be attached for pulling down the trolley. The other portion of the harp construction consists of a plate 24 upon one edge of which an apertured ear 25 is formed to engage one side of the lug 17. A second ear 26 is formed on said plate in spaced relation to the ear 25 to engage the other side of the lug 17, the latter and the ears 25 and 26 being then joined by means of a bolt 27 forming a pivot so that the plate 24 may move in a vertical plane relative to the pole. The portion 28 integrally connecting the ear 26 with the plate 24 is vertically spaced from an extension 29 of said plate 24, to provide a horizontally disposed recess. A second plate 30 is provided and formed with a lateral lug 31 to enter and fit the recess between the connection 28 and extension 29. A pair of recesses 32 are formed in said plate 30 and the lug 31 and the bottoms of said recesses are perforated. Bolts 33 enter the recesses, extend through the perforations and are threaded into openings in the plate 24. A coiled spring 34 is embraced about each bolt 33 and interposed between the heads of the latter and the bottom walls of the recesses 32 to urge the plate 30 toward the plate 24. A pair of bolts 35 are held in the plate 24 and extend across the space to the plate 30, and a grooved trolley wheel 36 is journalled on each bolt. Each plate 24 and 30 is formed with a transverse opening 37 at a point midway of the wheels 36 and a screw 38 is extended downward through the top edge of each plate to intersect its opening, whereby a guiding wheel 39 may be mounted in each opening 37 to rotate upon its pin 38. Said wheels 39 are preferably frusto-conical in form and inverted.

In operation, the wheels 36 are engaged against the trolley wire 40 and owing to the pivotal connection of the harp both wheels will remain in engagement with the wire notwithstanding the vertical oscillation of the trolley pole which takes place when the car is running. The vertical pivot 16 will compensate for any rotation of the trolley pole relative to the harp, as, for instance, when the car is rounding a curve. It will be seen that should the harp be thrown from side to side either wheel 39 will engage the wire, thus preventing the harp from leaving the wire, and by reason of the inclined faces of said wheels cause the harp to be slightly raised to reseat the wheels against the trolley wire. The under side of the plate 24 and the upper side of the extension 22 are each provided with a recess 41 in which the ends of a spring 42 are seated. This spring resiliently maintains the harp in contact with the trolley wire.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new, and desire to secure by United States Letters Patent is:—

1. A trolley harp including a frame, a pair of grooved trolley wheels mounted in the frame, and a pair of anti-friction wheels mounted on said frame between said first mentioned wheels to engage the trolley wire when the harp is moved laterally in either direction.

2. A trolley harp including a frame, a pair of grooved trolley wheels mounted therein to rotate in a vertical plane, and a pair of guide wheels mounted in said frame to rotate in a horizontal plane, between the first mentioned wheels in spaced relation to receive the trolley wire therebetween.

3. A trolley harp including a pair of frame sections connected for movement toward and away from each other, resilient means urging them together, a trolley wheel carried by one section, and a flange formed on each section to receive the trolley wire therebetween.

4. A trolley harp including a frame section to be mounted on the trolley pole, a second frame section mounted on the first section for movement toward and away therefrom, resilient means urging said sections together, a trolley wheel mounted on the first section, a flange on each section receiving the trolley wheel therebetween, and an anti-friction means mounted on each flange.

In testimony whereof I affix my signature in presence of two witnesses.

LOUIS VOLLMUTH. [L. S.]

Witnesses:
ALFRED SHACKLETON,
CHARLES H. ALLEN.